Figure 1:
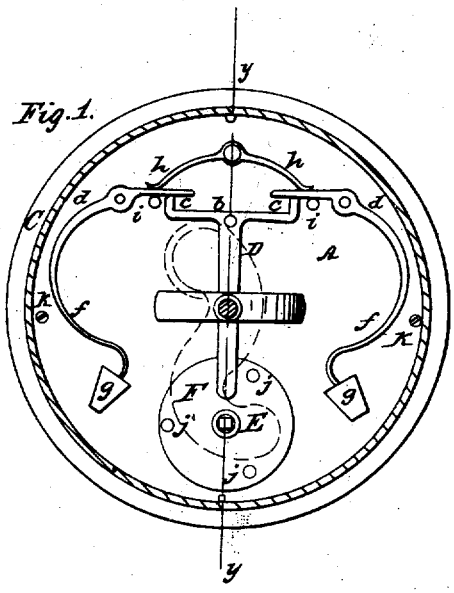

A. E. TAYLOR.

Bell Attachment.

No. 3,234.

Reissued Dec. 15, 1868.

Witnesses:

W. L. Bennett

John Rathbone Jr.

Inventor:

A. E. Taylor by E. T. Renwick

Atty.

N. PETERS, Photo-Lithographer, Washington, D. C.

United States Patent Office.

A. E. TAYLOR, OF NEW BRITAIN, CONNECTICUT.

*Letters Patent No.* 30,509, *dated October* 23, 1860; *reissue No.* 3,234, *dated December* 15, 1868.

IMPROVEMENT IN BELL-ATTACHMENT.

The Schedule referred to in these Letters Patent and making part of the same.

*To all whom it may concern:*

Be it known that I, A. E. TAYLOR, formerly of Ogdensburg, in the county of St. Lawrence, and State of New York, but now of New Britain, in the county of Hartford, and State of Connecticut, invented a new and improved Bell-Attachment for doors; and I do hereby declare that the following is a full, clear, and exact description and specification of the same.

Previous to my invention, it was customary to actuate the hammers of gong door-bells by means of bell-pulls, situated at a distance from the bell, and connected with the hammer by means of bell-wires, which were pulled longitudinally by the bell-pull, and transmitted the force to the striking-mechanism of the bell. The bell-pulls that were used in such cases, were constructed either to reciprocate in a straight line or upon an axis, a crank-handle, in the latter case, being applied to one end of a short shaft passing through the door-frame, and fitted with a crank at the other end, to receive the end of the bell-wire. Such constructions, with bell-wire connections between the striking-mechanism and the handle by which the hammer is actuated, are expensive, require an expert to put them up, and are very liable to get out of order.

The object of the first part of my invention is to dispense with the customary bell-wire connections between the striking-mechanism and the handle, so that the bell, and its striking-mechanism, may be applied directly to the interior of the wall or door-casing, at the exterior of which the handle or bell pull is placed. To this end, my invention consists of the combination of the bell, and the hammer thereof, with a handle, (to which the operator can apply his hand,) a shaft, constructed to be turned partially or wholly on its axis by said handle, and a cam-pin or its equivalent, to which a turning-motion is imparted by said shaft, without the intervention of a bell-wire. This combination enables the bell-mechanism to be put up with great facility, as the bell and its striking-mechanism may all be secured to a plate or stock, which can be screwed fast to the interior of the door-casing, while the shaft is passed through a hole in the casing, and the handle is applied to its exterior. The handle, also, may be turned in either direction without risk of breakage, as there is no bell-wire to be strained by such movement.

The object of the second part of my invention is to insure the ringing of the bell, whatever be the direction in which the handle is turned; and it consists of the combination of the bell, handle, shaft, and cam-pin or its equivalent, with a vibratable forked lever and hammer-lever arms, projecting in opposite directions from their fulcra, so that one of said hammer-lever arms is operated through the intervention of one prong of the forked lever, when the handle and cam-pin are turned in one direction, and the other hammer-lever arm is operated through the intervention of the other prong of the forked lever, when the handle and cam-pin are turned in the opposite direction.

I prefer to embody both parts of my invention in the same apparatus, (although this is not essential, as the first part of my invention may be used without the second.) I will therefore proceed to describe such an apparatus, which I have represented in the accompanying drawing—

Figure 2:
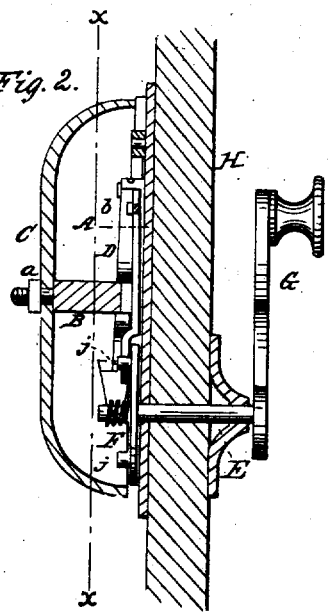

Figure 1 being a face view of the mechanism by which the bell-hammers are operated, the bell being represented in section, as if cut at the line *x x*, fig. 2, in order to show the mechanism.

Figure 2 is a vertical section of the bell, and the mechanism connected with it, taken in the line *y y*, fig. 1.

Similar letters of reference indicate corresponding parts in the two figures.

A represents a metal plate, to the centre of which a stud, B, is attached at right angles, said stud forming a support or means of attachment for a bell, C, of the usual stationary kind, which is attached to the stud by a nut, *a*, the edge of the bell being within a short distance of the plate A.

To the side of the plate A that faces the bell C, a lever, D, is attached, *b* being its fulcrum-pin.

One end of this lever is forked, as shown at *c c*, and the prongs are opposite the arms of hammer-levers *d*, which rock upon fulcra *e e*, that connect the hammer-levers with the plate A.

The hammer-levers at one end terminate in spring-hammer helves, *f f*, to which heads of hammers, *g*, are attached, one to each spring-helve.

Against each hammer-lever *d*, a spring, *h*, bears, said springs being attached to the plate A, and bearing against the arms of the hammer-levers *d*, at the sides opposite to those against which the prongs *c c*, of the forked lever D, bear.

To the plate A, two pins or stops, *i i*, are attached, one near each hammer-lever *d*, said stops serving as bearings for the levers, and preventing them from being impelled beyond their proper positions by the springs *h h*.

E is a shaft, which passes through the plate A, and has a circular disk, F, attached to its end.

This disk has a series of cam-pins or studs, *j*, projecting from it, near its periphery, at right angles to its face, and the end of the forked lever D, which is furthest from the prongs *c*, projects within the curved path of movement of said cam-pins, as shown clearly in fig. 1.

It is manifest that the bell may be arranged to be operated by one hammer only, and by turning the shaft only part of a revolution, and there may be one, two, or three cam-pins or studs, without substantially changing the character of the invention.

To the outer end of the shaft E, a crank-handle, G, is attached.

The plate A is secured by screws, K, to the inner side of the door-post or stile of the door-casing H, the shaft E being passed through the same, and the crank-handle G being at the outer side of the door or door-post, as shown clearly in fig. 2.

From the above description it will be seen that, by turning the crank-handle G, the pins *j* actuate the forked lever D, and either prong *c*, according to the direction in which the crank-handle is turned, will move the corresponding arm of the hammer-lever *d;* and, as the pins *j* pass the end of the lever on which they act, the springs *f* force the hammer-levers and the hammers back towards their original positions. The stops *i i* arrest the movement of the shanks of the hammer-levers, while the flexibility of the spring-helves permits the hammers to continue their movement by momentum, so as to strike sharply against the bell, and produce the required sound.

This invention may be applied to any ordinary door, and will prove to be far superior to the ordinary knockers, and preferable to the usual door-bells, when applied to the doors of houses that have no basement, as is the case with the majority of country houses, in which case the bells are hung in the hall.

My invention may be applied by almost any person, as little or no mechanical skill is required in attaching it to the door, or stile of the door-frame, or casing, and the necessity of putting up bell-wires, to connect the bell-pull with the mechanism at the bell, is dispensed with.

Having thus described my invention, and the mode in which I have embodied it,

What I claim as new, and desire to secure by Letters Patent, is—

The combination of the bell, bell-hammer, handle, turning-shaft, and cam-pin, substantially as before set forth Also, the combination of the bell, handle, turning-shaft, cam-pin or stud *j*, one or more, forked lever, and hammer-lever arms, projecting in opposite directions from their fulcra, substantially as before set forth.

In testimony whereof, I have hereto set my hand, this 25th day of May, A. D. 1868.

A. E. TAYLOR.

Witnesses:
A. T. COLLINS,
W. J. BULKLEY.